(12) United States Patent
Nishimura et al.

(10) Patent No.: US 7,341,387 B2
(45) Date of Patent: Mar. 11, 2008

(54) IMAGE FORMING APPARATUS

(75) Inventors: Soichiro Nishimura, Handa (JP);
Hideaki Deguchi, Nagoya (JP)

(73) Assignee: Brother Kogyo Kabushiki Kaisha,
Nagoya (JP)

( * ) Notice: Subject to any disclaimer, the term of this patent is extended or adjusted under 35 U.S.C. 154(b) by 224 days.

(21) Appl. No.: 11/061,527

(22) Filed: Feb. 22, 2005

(65) Prior Publication Data

US 2005/0196217 A1 Sep. 8, 2005

(30) Foreign Application Priority Data

Mar. 8, 2004 (JP) .............................. 2004-064394

(51) Int. Cl.
*B41J 29/00* (2006.01)
*B65H 29/22* (2006.01)
*G03G 15/00* (2006.01)

(52) U.S. Cl. ........................ 400/693; 399/363; 399/377
(58) Field of Classification Search ................ 399/405, 399/363
See application file for complete search history.

(56) References Cited

U.S. PATENT DOCUMENTS

| 5,532,826 | A | | 7/1996 | Miyao et al. | |
| 5,534,989 | A | * | 7/1996 | Rubscha et al. | ............ 399/381 |
| 5,881,351 | A | | 3/1999 | Shimotoso et al. | |
| 6,304,742 | B1 | | 10/2001 | Nunes et al. | |
| 2003/0175060 | A1 | * | 9/2003 | Suzuki | ........................ 399/401 |

FOREIGN PATENT DOCUMENTS

| JP | A 61-118773 | | 6/1986 |
| JP | 61243463 A | * | 10/1986 |
| JP | Y2 4-8132 | | 3/1992 |
| JP | 04277157 A | * | 10/1992 |
| JP | A-05-134503 | | 5/1993 |
| JP | 05173376 A | * | 7/1993 |
| JP | A-07-162610 | | 6/1995 |
| JP | 09230653 A | * | 9/1997 |
| JP | 2000309467 A | * | 11/2000 |
| JP | 2000327170 A | * | 11/2000 |
| JP | 2001180864 A | * | 7/2001 |
| JP | 2003072190 A | * | 3/2003 |

OTHER PUBLICATIONS

Machine translation of JP 2003-072190 to Mochimaru from Japanese Patent Office website.*

* cited by examiner

*Primary Examiner*—Daniel J. Colilla
(74) *Attorney, Agent, or Firm*—Oliff & Berridge, PLC

(57) ABSTRACT

An image forming apparatus includes a cover member that is capable of being opened and closed, wherein the cover member includes a discharge tray that is capable of holding printed recording medium, and an automatic document reader that is provided above the discharge tray, wherein when the cover member is opened to a predetermined position, the automatic document reader supports the printed recording medium placed on the discharge tray so that the printed recording medium does not fall therefrom when the cover member is open.

21 Claims, 10 Drawing Sheets

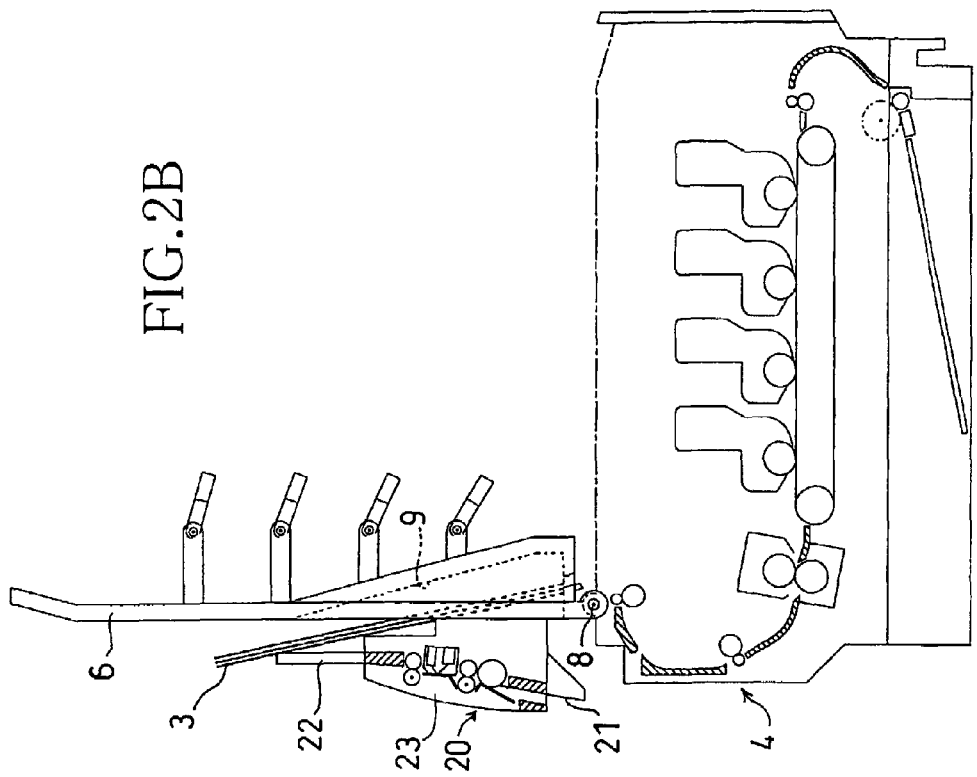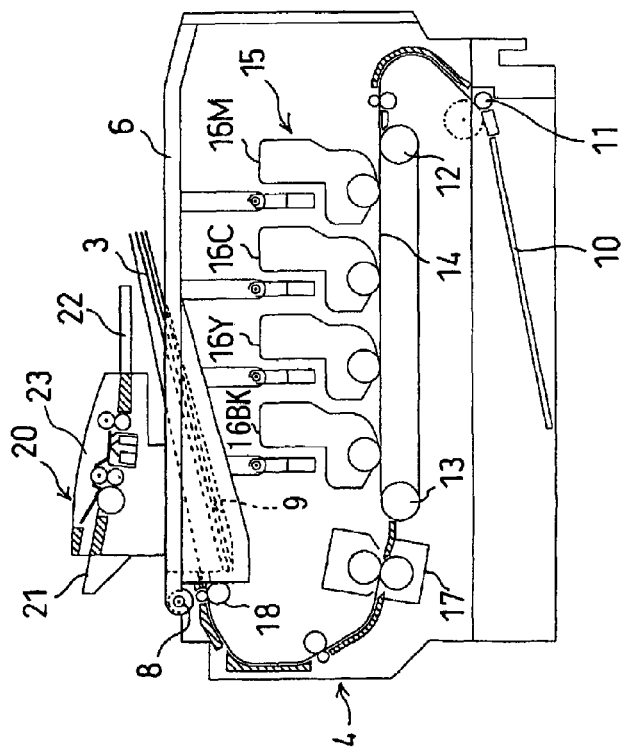

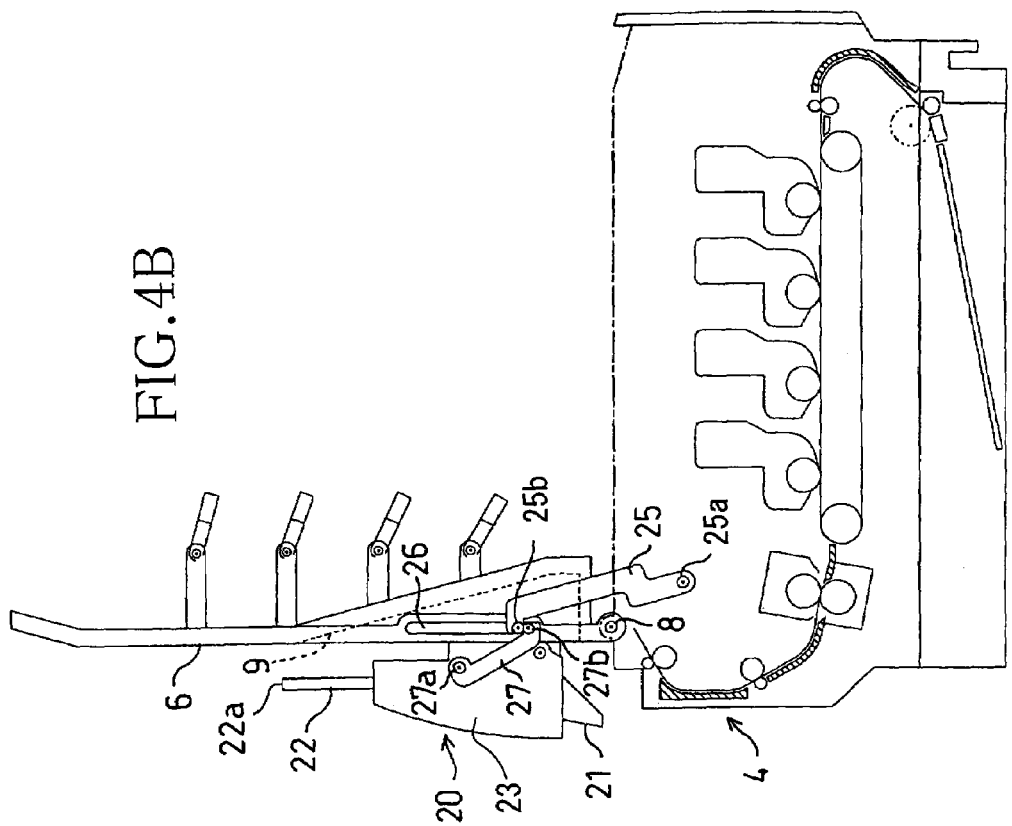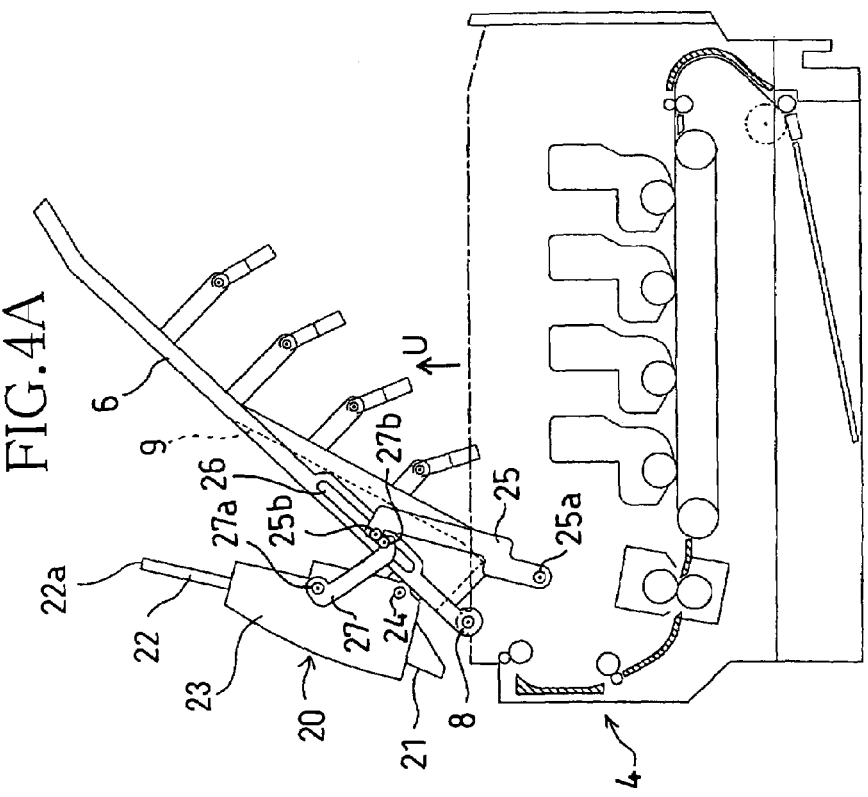

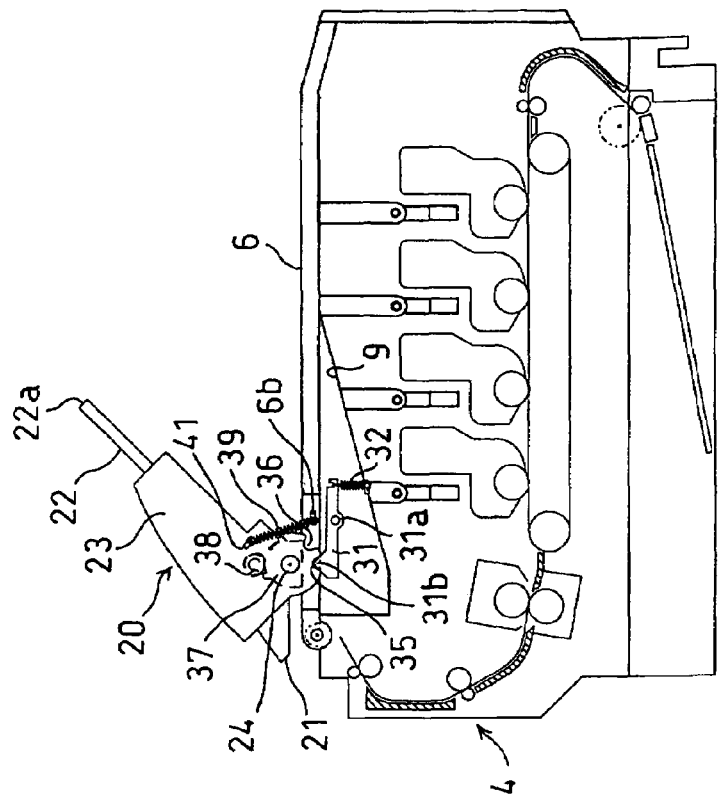
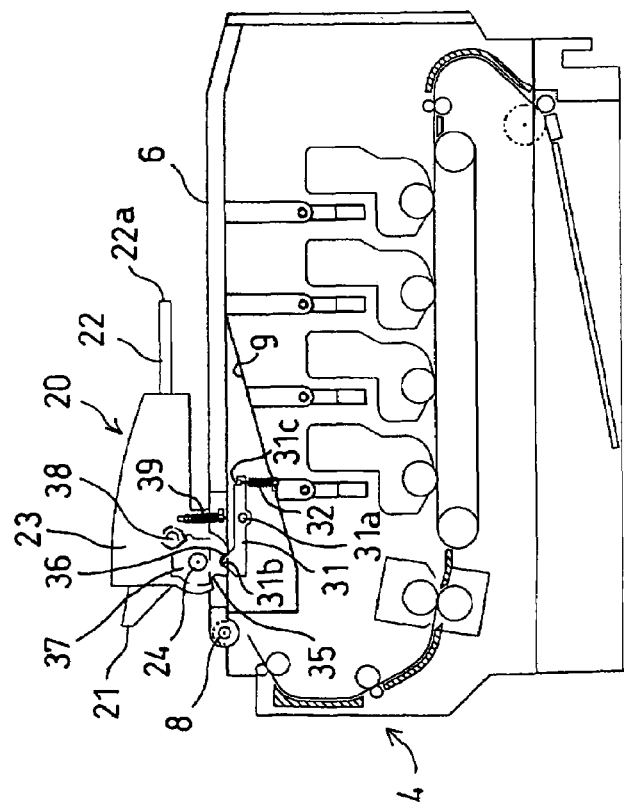

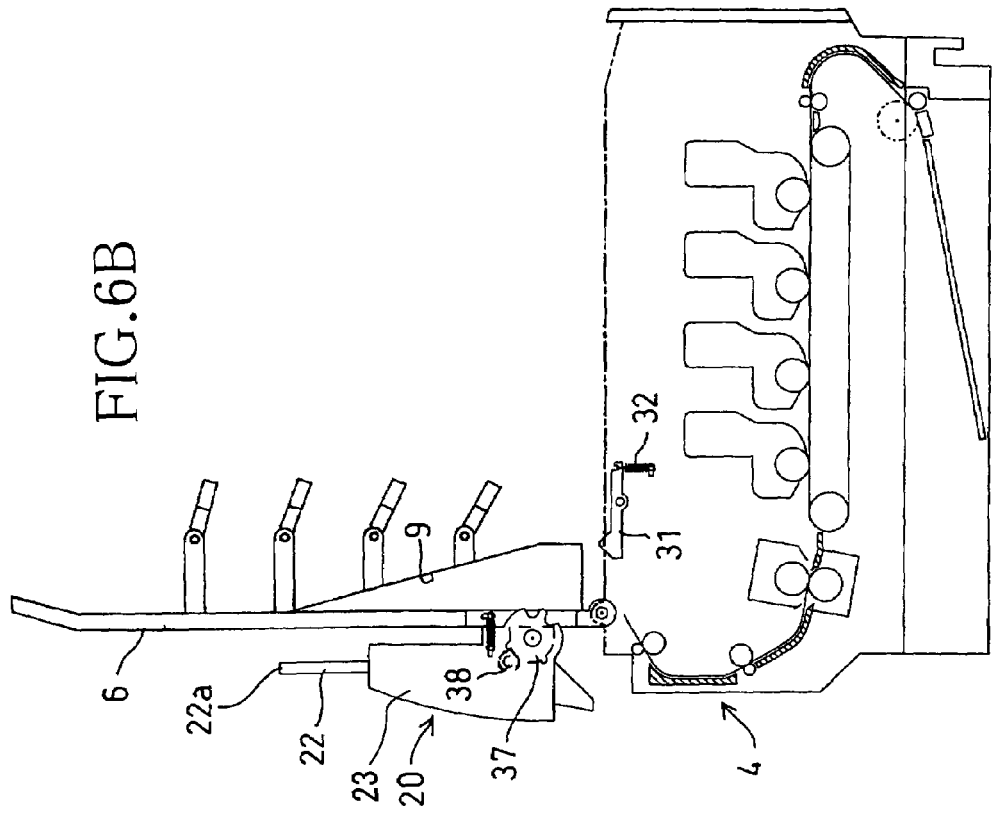
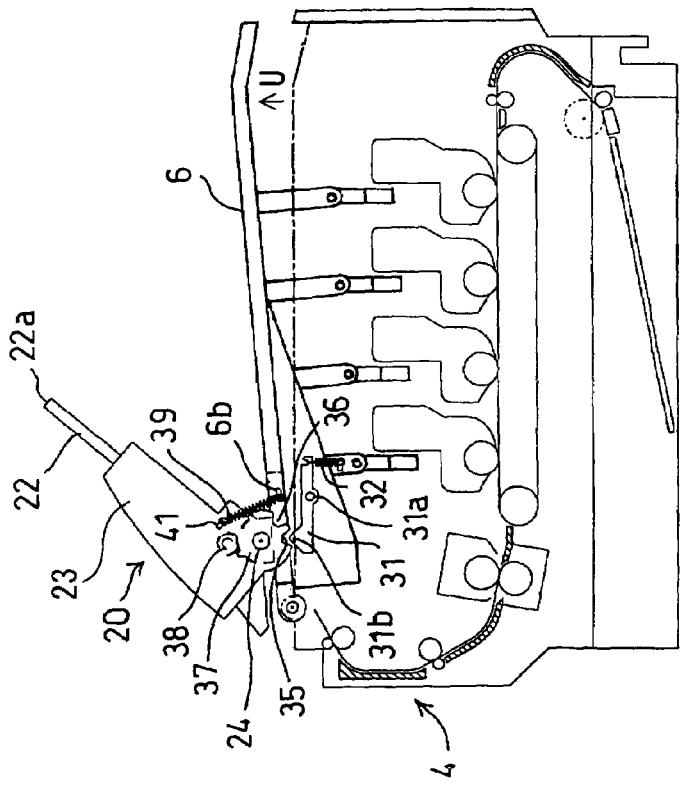

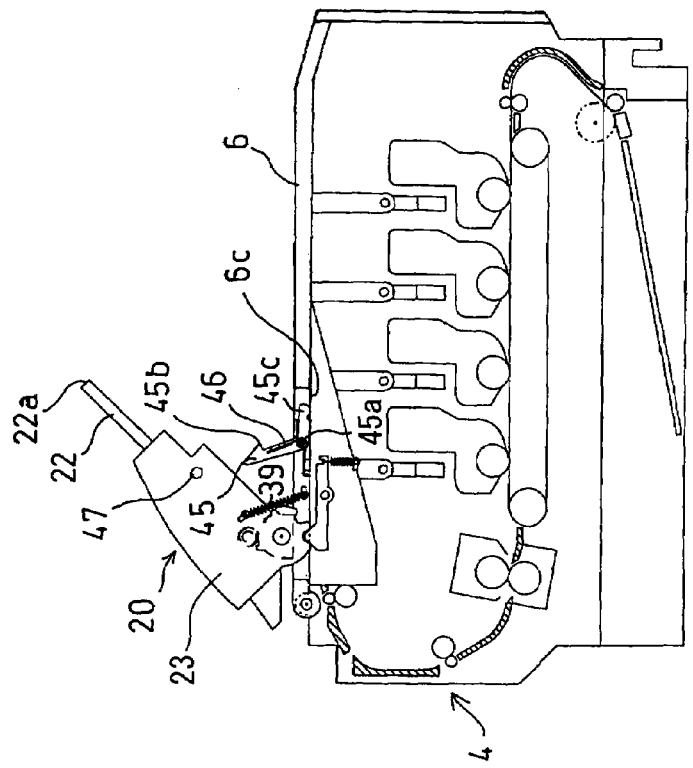
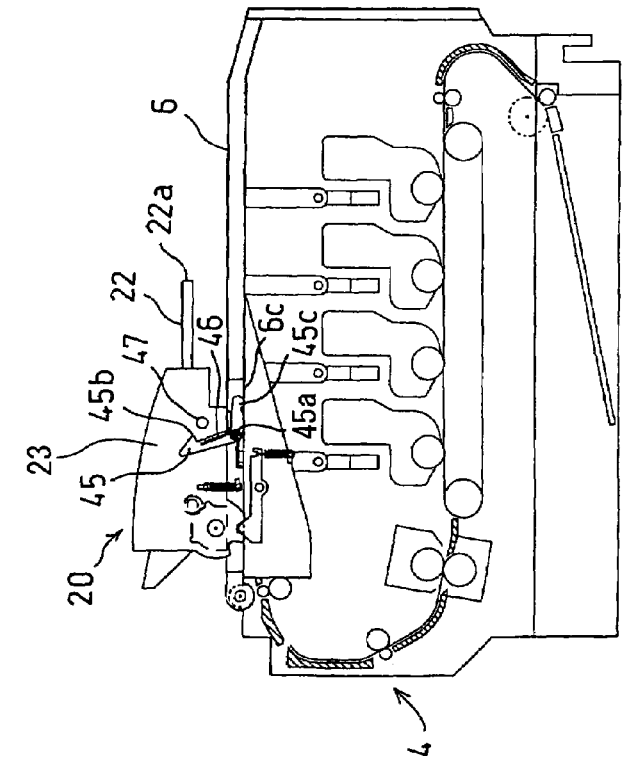

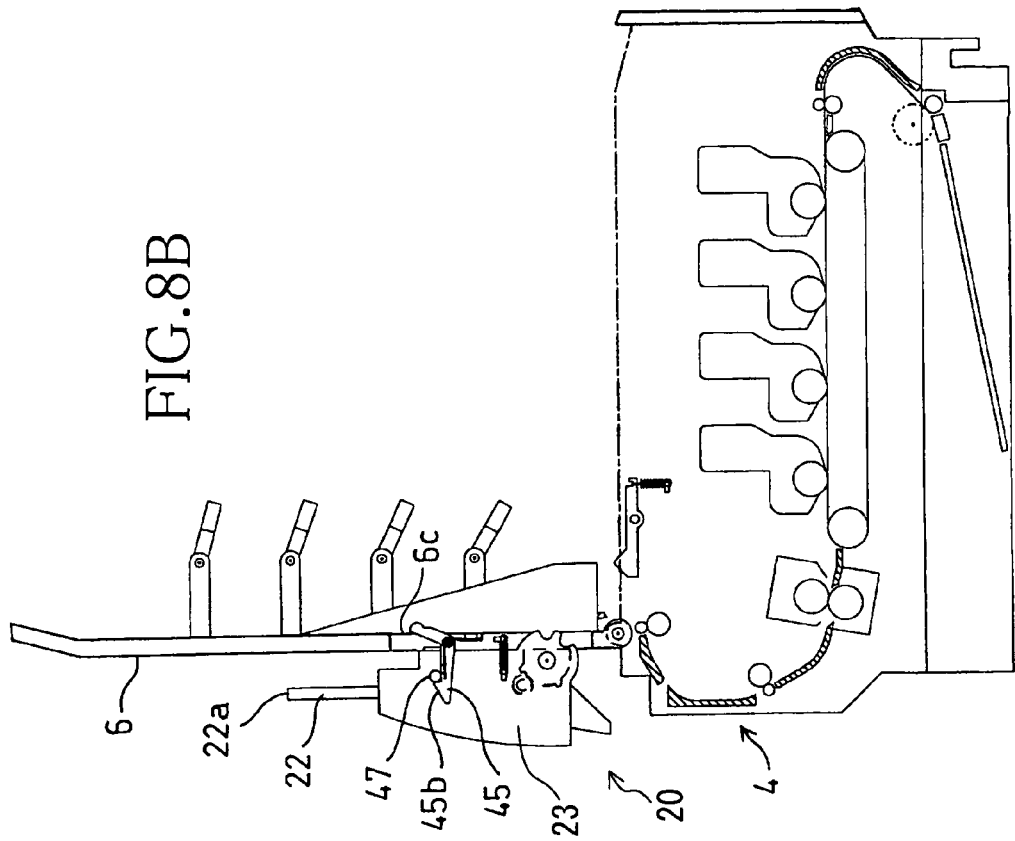
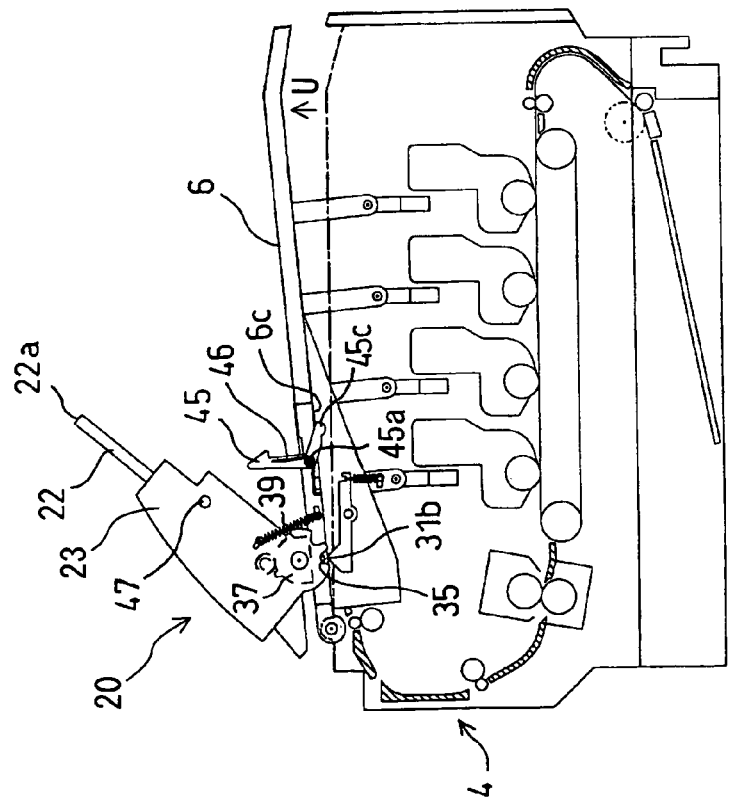

US 7,341,387 B2

IMAGE FORMING APPARATUS

INCORPORATION BY REFERENCE

This application claims priority from Japanese Patent Application No. 2004-064394, filed Mar. 8, 2004, the subject matter of which is incorporated herein in its entirety by reference thereto.

BACKGROUND

The disclosure relates to an image forming apparatus of a multifunctional machine having a printing function, a copying function, a scanning function and a facsimile function.

Conventionally, in a printer of a multifunctional machine having a printing function, a copying function, a scanning function and a facsimile function, for the sake of saving installation space for the printer, a sheet discharge tray is often provided at a top of the printer. For example, in a tandem-type laser beam printer, a rotatable lid is provided at a top of the printer. In the printer, the lid is open to replace consumable supplies, such as developing units, or clear a paper jam.

SUMMARY

However, if the lid of the printer is open while printed sheets are placed on the sheet discharge tray, the printed sheets fall from the sheet discharge tray. Therefore, the printed sheets need to be temporarily removed from the sheet discharge tray every time the lid of the printer is open.

Japanese Utility Model Publication No. 4-8132 discloses an image forming apparatus including a sheet support mechanism which supports printed sheets placed on a sheet discharge tray so as not to fall therefrom when a lid of the image forming apparatus is open. However, in the image forming apparatus disclosed in Japanese Utility Model Publication No. 4-8132, the sheet support mechanism includes a lever, a cam and a spring which are separately provided in an upper box of the image forming apparatus. If such a sheet support mechanism is adopted in a printer, the structure of the printer will be complicated and a parts count will be increased.

The disclosure provides, among other things, an image forming apparatus that includes a simple sheet support device which prevents printed sheets from falling off a sheet discharge tray of a body casing therefrom, wherein the sheets printed in the body casing are discharged to a top of the body casing.

According to one exemplary aspect of disclosure, an image forming apparatus includes a cover member that is capable of being opened and closed, wherein the cover member includes a discharge tray that is capable of holding printed recording medium, and an automatic document reader that is provided above the discharge tray, wherein when the cover member is opened to a predetermined position, the automatic document reader supports the printed recording medium placed on the discharge tray so that the printed recording medium does not fall therefrom when the cover member is open According to one exemplary aspect of disclosure, an image forming apparatus includes a body that stores therein an image forming portion, a cover member that is attached to the body at a first end of the cover member and is capable of being opened and closed by rotating about the first end, wherein the cover member includes a discharge tray that is capable of holding printed recording medium, and an automatic document reader that is provided above the discharge tray and attached to the cover member at the first end of the cover member, wherein the automatic document reader extends from the first end and covers a part of the discharge tray.

BRIEF DESCRIPTION OF THE DRAWINGS

Exemplary embodiments of the disclosure will be described in detail with reference to the following figures wherein:

FIG. 2A is a side view showing essential parts of the color printer of FIG. 1, wherein an upper cover is closed;

FIG. 2B is a side view showing essential parts of the color printer of FIG. 1, wherein the upper cover is open;

FIGS. 4A and 4B represent a color printer according to an exemplary embodiment of the disclosure;

FIGS. 5A and 5B represent a color printer according to an exemplary embodiment of the disclosure;

FIGS. 6A and 6B represent a color printer according to an exemplary embodiment of the disclosure;

FIGS. 7A and 7B represent a color printer according to an exemplary embodiment of the disclosure;

FIGS. 8A and 8B represent a color printer according to an exemplary embodiment of the disclosure;

DETAILED DESCRIPTION OF EMBODIMENTS

Figure 1:
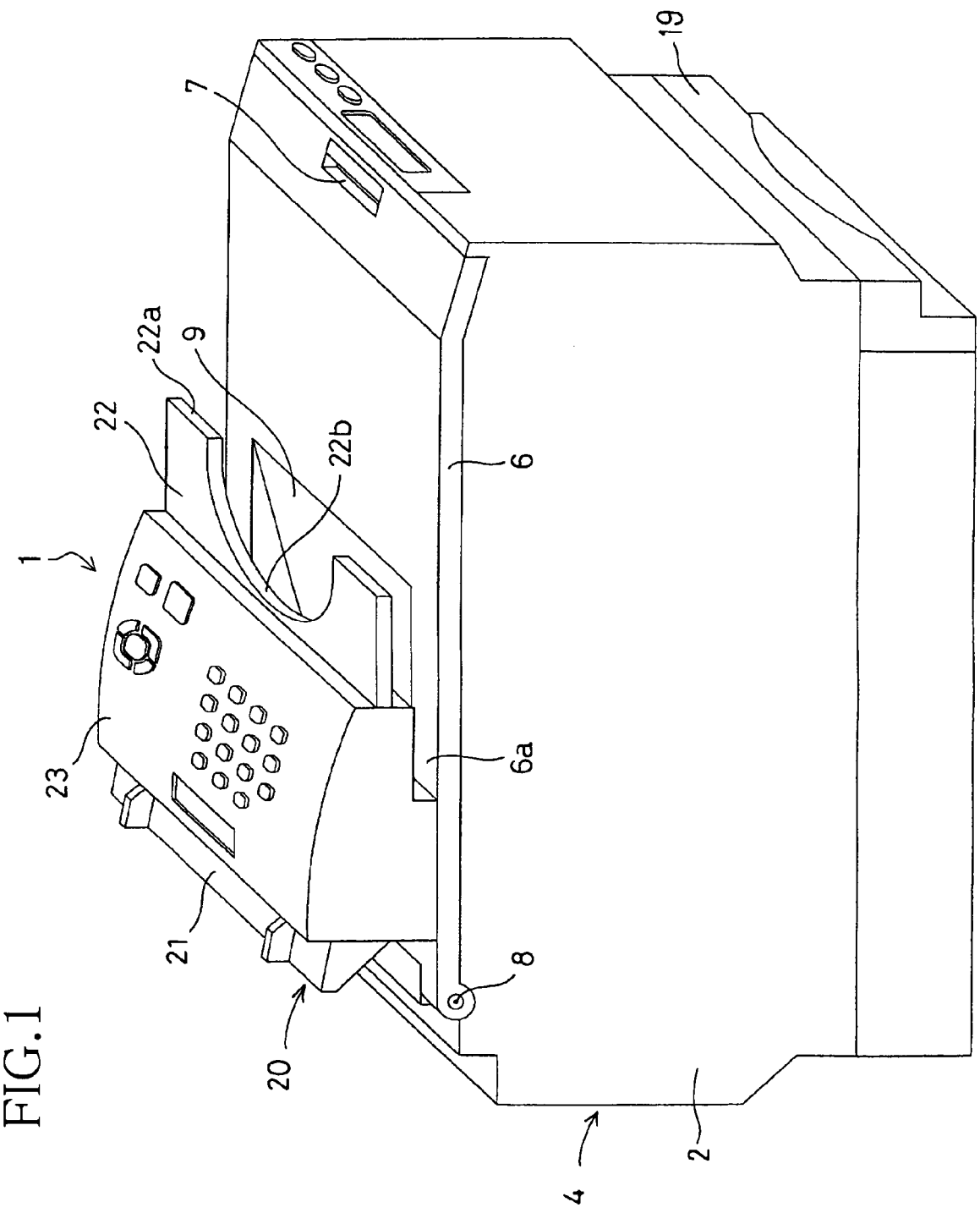
FIG. 1 is a perspective view of a color printer having a scanning function according to an exemplary embodiment of an image forming apparatus of the disclosure.

Exemplary embodiments of the disclosure will be described with reference to the accompanying drawings. FIG. 1 is a perspective view of a color printer 1 having a scanning function, as an image forming apparatus, according to a first exemplary embodiment.

In the exemplary embodiments described below, a document is inserted from the left and is conveyed to the right in FIG. 1. A sheet is discharged from the color printer 1 to the right in FIG. 1. A user operates the color printer 1 from the right in FIG. 1. Throughout the specification, the upper side in FIG. 1 is referred to as an upper side of the color printer 1. The lower side in FIG. 1 is referred to as a lower side of the color printer 1. The near side in FIG. 1 is referred to as the left side of the color printer 1. The far side in FIG. 1, which is an opposite side to the near side, is referred to as the right side of the color printer 1.

As shown in FIG. 1, the color printer 1 includes a printing device 4 and an automatic document reader 20. At a top of the printing device 4, an upper cover 6 is provided. The upper cover 6 has a cover shaft 8 on an upstream side in a document conveying direction. The upper cover 6 rotates about the cover shaft 8 to be opened and closed. To open the upper cover 6, a cover handle 7, which is provided to the upper cover 6 on a downstream side in a sheet discharge direction, is pulled upward. A printed sheet discharge tray 9 is provided as a part of the upper cover 6. The automatic document reader 20 is provided on a cover top face 6a of the upper cover 6, that is, above the sheet discharge tray 9.

At a bottom of the printing device 4, a sheet feed cassette 19 is provided in order to store sheets 3 therein. The sheet feed cassette 19 is detachably attachable to a body casing 2 of the color printer 1 from a side which is the same as the downstream side in the sheet discharge direction.

The automatic document reader 20 includes at least a document feed tray 21, a document discharge tray 22 having a tip 22a, and a document reading portion 23. The document reading portion 23 is provided between the document feed tray 21 and the document discharge tray 22. The document reading portion 23 is a feeder-type reading portion that reads a document while the document is being conveyed with respect to a fixed reading sensor (an optical sensor).

FIGS. 2A and 2B are side views showing essential parts of the color printer 1 of FIG. 1. FIG. 2A illustrates the color printer 1 with its upper cover 6 closed. FIG. 2B illustrates the color printer 1 with its upper cover 6 open.

Referring to FIG. 2A, an outline of a printing path of the sheet 3 as a recording medium will be described below.

The sheet feed cassette 19 includes a sheet feed tray 10 and a sheet supply roller 11. In FIG. 2A, a sheet 3 is fed to an image forming portion 15 from the sheet feed tray 10 by the sheet supply roller 11. At the image forming portion 15, the sheet 3 is placed on a conveyor belt 14, which is wound around conveyor rollers 12, 13, and is conveyed by rotation of the conveyor belt 14. While the sheet 3 is being conveyed by the conveyor belt 14, a plurality of developing agent images are transferred onto the sheet 3 by process units 16M, 16C, 16Y, 16BK, which are provided and aligned by color. Then, at a fixing portion 17, the developed images transferred onto the sheet 3 are thermally fixed thereon. The sheet 3 passed through the fixing portion 17 is then discharged onto the sheet discharge tray 9 by a sheet discharge roller 18.

In a state of FIG. 2A, the discharge direction of the sheet 3 to be discharged onto the sheet discharge tray 9 is the same as the discharge direction of the document to be discharged onto the document discharge tray 22. Therefore, the sheet 3 and the document can be taken out of the respective discharge trays 9, 22 from the same side of the body casing 2, so that user operability can be increased.

In addition, as described above, the sheet feed cassette 19 can be attached to and detached from the body casing 2 from the same side as the sheet discharge direction in the sheet discharge tray 9. Accordingly, the user operability can be further improved.

In a state of FIG. 2B, the printed sheets 3 are supported by the document reading portion 23 and the document discharge tray 22 of the automatic document reader 20, so that the sheets 3 do not fall from the sheet discharge tray 9. In addition, the upper cover 6 is rotated to a position where the upper cover 6 extends substantially in a upright direction, so that a replenishing or replacing of developing agent for the process units 16M, 16C, 16Y, 16BK disposed under the upper cover 6 can be easily performed. The upper cover 6 is rotated upward from the side near to the user. Accordingly, the user can easily access and operate the image forming portion 15 in the body casing 2 without obstacles, such as the automatic document reader 20, by opening the upper cover 6. Thus, as well as the replenishing or replacing of developing agent, maintenance can be easily and speedily performed while preventing the fall of a sheet caused by the opening of the upper cover 6, even when the sheet is placed on the sheet discharge tray 9.

A second exemplary embodiment of the disclosure will be described with reference to FIGS. 3A to 4B. The same parts or portions are designated by the same reference numerals as those in FIGS. 2A and 2B, and explanations for those parts or portions will be omitted.

Figure 3A:
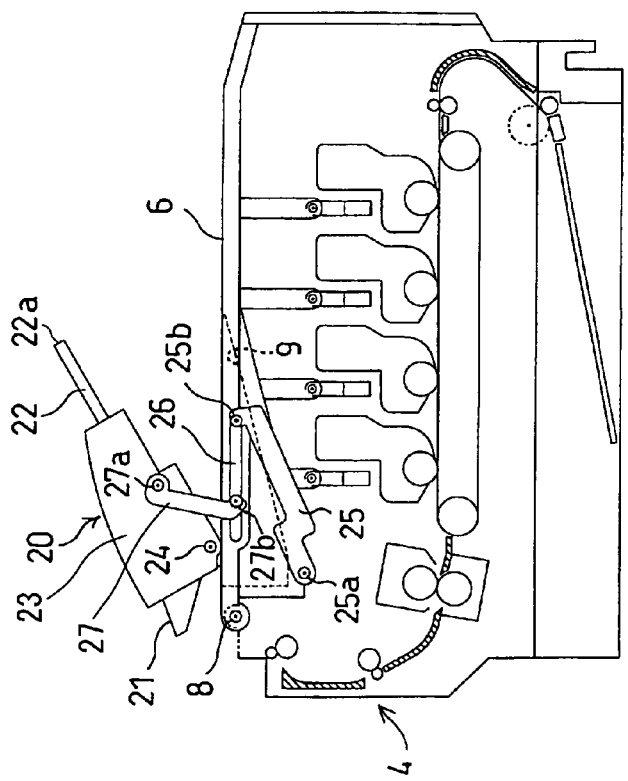
FIGS. 3A and 3B represent a color printer according to an exemplary embodiment of the disclosure.

In FIG. 3A, the document reading portion 23 of the second exemplary embodiment can rotate about a fixed shaft 24 by a predetermined angle in a direction which the document reading portion 23 moves away from the upper cover 6. A guide slot 26 is provided at at least one side (the left side of the color printer 1) of the upper cover 6 so as to extend along the upper cover 6. The guide slot 26 is an elongated hole that linearly extends substantially in parallel with the upper cover 6 when the upper cover 6 is closed.

A cover arm 25, which is a substantially straight member, is provided on the printing device 4 side. The cover arm 25 has an cover arm hinge 25a at one end and a cover arm roller 25b at another end. The cover arm hinge 25a is fixed to the body casing 2 of the printing device 4. The cover arm roller 25b is engaged with the guide slot 26 and can slide along the guide slot 26. The cover arm 25 rotates about the cover arm hinge 25a. In accordance with the rotation of the cover arm 25, the cover arm roller 25b slides in the front and back directions in the guide slot 26.

As shown in FIG. 3A, a guide arm 27, which is a substantially straight member, is provided on the automatic document reader 20 side. The guide arm 27 has a guide arm hinge 27a at one end and a guide arm roller 27b at another end. The guide arm hinge 27a is fixed to the automatic document reader 20. The guide arm roller 27b is engaged with the guide slot 26 and can slide along the guide slot 26. Therefore, the guide arm 27 rotates about the guide arm hinge 27a. In accordance with rotation of the guide arm 27, the guide arm roller 27b slides along the guide slot 26.

Figure 3B:
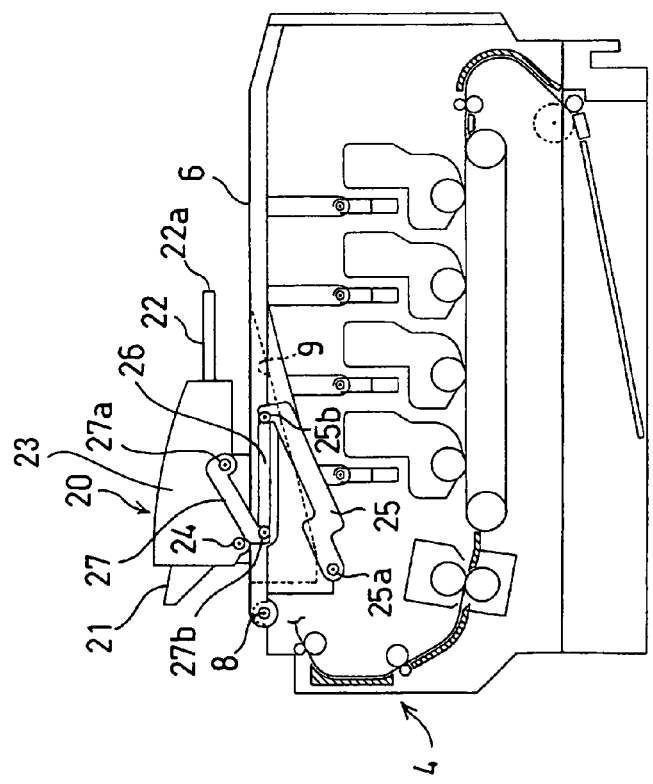

As shown in FIG. 3B, in the state where the upper cover 6 of the printing device 4 is closed, the automatic document reader 20 can be rotated (open) upward by a predetermined angle. Accordingly, the printed sheets 3 placed on the sheet discharge tray 9 can be easily removed therefrom. In particular, the removal of a small-sized sheet 3 therefrom is easier to perform. The guide slot 26 is provided with a click resistance applying device that slightly applies a click resistance to the guide arm roller 27b when the guide arm roller 27b is located at a position shown in FIG. 4B. The automatic document reader 20 can be temporarily retained at an upright position of FIG. 4B. By sliding the guide arm roller 27b by a force stronger than the click resistance, the retirement of the automatic document reader 20 can be easily released.

When the upper cover 6 is further rotated upward (in a direction indicated by an arrow U in FIG. 4A) from the state of FIG. 3B, the cover arm roller 25b of the cover arm 25 slides in a direction toward the cover shaft 8 along the guide slot 26 as shown in FIG. 4A. When the cover arm roller 25b of the cover arm 25 abuts against the guide arm roller 27b of the guide arm 27 in the guide slot 26, the cover arm roller 25b pushes and slides the guide arm roller 27b toward the cover shaft 8 along the guide slot 26.

When the guide arm roller 27b slides toward the cover shaft 8 along the guide slot 26, the guide arm 27 rotates about the guide arm hinge 27a. The rotating direction of the guide arm 27 is a direction which the automatic document reader 20, which is in the state shown in FIG. 4A, is rotated toward the upper cover 6. That is, in conjunction with the opening of the upper cover 6 in the state where the automatic document reader 20 is upwardly rotated (opened), the automatic document reader 20 moves to a proximity position with respect to the sheet discharge tray 9. That is, the automatic document reader 20 is automatically rotated downward (closed) as the upper cover 6 opens. Then, the tip 22a of the document discharge tray 22 is brought closer to the upper surface of the upper cover 6.

As described above, when the upper cover 6 is upwardly open as shown in FIG. 4B, the cover arm roller 25b of the cover arm 25 pushes and slides the guide arm roller 27b of the guide arm 27 to the end of the guide slot 26 on the cover shaft 8 side. Therefore, the guide arm 27 rotates about the guide arm hinge 27a, so that the tip 22a of the document discharge tray 22 of the automatic document reader 20 is located at the nearest position with respect to the upper cover 6.

As a result, in the state of FIG. 4B, the sheet 3 is supported by the document reading portion 23 and the document discharge tray 22 of the automatic document reader 20, so that the sheet 3 does not fall from the sheet discharge tray 9.

When the upper cover 6, which is upwardly rotated as shown in FIG. 4B, is rotated downward about the cover shaft 8 to be closed, the cover arm 25 and the guide arm 27 slide in the direction reverse to the direction when the upper cover 6 is opened. Thus, the upper cover 6 can be returned to the state of FIG. 3A.

In the second exemplary embodiment, the cover arm 25, the guide slot 26 and the guide arm 27 are provided at the left end of the upper cover 6. However, the cover arm 25, the guide slot 26 and the guide arm 27 may be provided at both right and left ends of the upper cover 6.

Next, a third exemplary embodiment of the disclosure will be described with reference to FIGS. 5A to 6B. The same parts or portions are designated by the same reference numerals as those in FIGS. 2A and 2B, and explanations for those parts or portions will be omitted.

As shown in FIG. 5A, a substantially straight lever 31 is provided on at least one side (a left side in the third exemplary embodiment) of the body casing 2 of the printing device 4. The lever 31 has a lever hinge 31a at a substantially center portion of the lever 31 in its longitudinal direction. The lever hinge 31a is fixed to the body casing 2 of the printing device 4. Therefore, the lever 31 can swing in the up and down directions about the lever hinge 31a.

The lever 31 has a lever protrusion 31b at one end and a lever cutaway portion 31c at another end. A spring 32 is attached to the lever cutaway portion 31c so as to pull the lever cutaway portion 31c of the lever 31 downward. With this structure, the lever protrusion 31b of the lever 31 is urged upward about the lever hinge 31a by the spring 32.

The document reading portion 23 of the automatic document reader 20 is provided with a first notch 35 and a second notch 36 at same radial positions about the fixed shaft 24 such that the first and second notches 35, 36 face the lever protrusion 31b of the lever 31.

A damper gear 38 is provided so as to be rotatable about a shaft (not shown) fixed to the document reading portion 23 of the automatic document reader 20. The damper gear 38 is engaged with a side gear 37 fixedly provided to the upper cover 6. The damper gear 38 moves around the side gear 37 while itself rotating when the automatic document reader 20 is opened and closed with respect to the upper cover 6. The damper gear 38 is provided with, for example, a damper material having an appropriate viscosity, at its rotating portion. With this structure, the damper gear 38 exerts its damper effect to make its rotation slow when the damper gear 38 tries to suddenly rotate.

A guide spring 39 is provided between the document reading portion 23 of the automatic document 20 and the upper cover 6. An one end of the guide spring 39 is caught by a side hook 41 (FIG. 5B) provided to the document reading portion 23 of the automatic document reader 20, and another end is caught by a cover hook 6b (FIG. 5B) provided to the upper cover 6. With this structure, the guide spring 39 urges the document reading portion 23 of the automatic document reader 20 toward the upper cover 6.

As shown in FIG. 5A, the lever protrusion 31b of the lever 31 is engaged with the second notch 36 in the state where the upper cover 6 is closed.

As shown in FIG. 5B, the automatic document reader 20 can be upwardly rotated by a predetermined angle against an urging force from the guide spring 39, from the state of FIG. 5A. Then, the document reading portion 23 rotates counterclockwise about the fixing shaft 24, so that the first notch 35 is engaged with the lever protrusion 31b of the lever 31. Therefore, a printed sheet 3 placed on the sheet discharge tray 9 can be easily removed therefrom. In particular, the removal of a small-sized sheet 3 therefrom is easier to perform.

Then, when the upper cover 6 is further rotated upward (in a direction indicated by an arrow U in FIG. 6A) from the state of FIG. 5B, the first notch 35 is disengaged from the lever protrusion 31b of the lever 31 as shown in FIG. 6A. Thus, the automatic document reader 20, which is located at the inclined position with respect to the upper cover 6 (FIG. 6A) by the urging force from the guide spring 39, is rotated (closed) toward the upper cover 6. At that time, the side gear 37 and the damper gear 38 are engaged with each other, so that the damper effect is caused to restrict the sudden rotation of the damper gear 38. As a result, the sudden rotation (closing) of the automatic document reader 20 toward the upper cover 6 caused by the urging force from the guide spring 39 is prevented.

As described above, as shown in FIG. 6B, when the upper cover 6 is opened upward, the tip 22a of the document discharge tray 22 of the automatic document reader 20 is located at the nearest position with respect to the upper cover 6.

As a result, in the state shown in FIG. 6B, a printed sheet 3 is supported by the document reading portion 23 and the document discharge tray 22 of the automatic document reader 20, resulting in sheets not falling from the sheet discharge tray 9.

When the upper cover 6, which is open upward as shown in FIG. 6B, is closed by rotating about the cover shaft 8, the lever 31 and the side gear 37 rotate in respective directions reverse to the directions when the upper cover 6 is opened. Finally, the upper cover 6 can be returned to the state of FIG. 5A.

In the third exemplary embodiment, the lever 31, the side gear 37 and the damper gear 38 are provided at the left end of the upper cover 6. However, the lever 31, the side gear 37 and the damper gear 38 may be provided on both right and left ends of the upper cover 6 as necessary.

Next, a fourth exemplary embodiment of the disclosure will be described with reference to FIGS. 7A to 8B. The same parts or portions are designated by the same reference numerals as those in FIGS. 5A and 5B, and explanations for those parts or portions will be omitted. A color printer 1 of the fourth exemplary embodiment includes a locking mechanism for the automatic document reader 20, based on the color printer 1 of the third exemplary embodiment.

As shown in FIG. 7A, a hook 45 is provided on at least one side of the upper cover 6. The hook 45 has a substantially L-shape and includes as a pawl portion 45b at an end of one side. The hook 45 is provided so at to be rotatable about a hook hinge 45a, wherein an end 45c, which is opposite to the end having the pawl portion 45b of the hook 45, is urged by a torsion spring 46 attached to the hook hinge 45a so as to rotate downwardly. In the state where the upper cover 6 is closed, an upper surface of the body casing 2 and an inner surface 6c of the upper cover 6 are contacted with each other, so that the end 45c of the hook 45 is in contact with the upper surface of the body casing 2 against an urging force from the torsion spring 46.

The automatic document reader 20 opposite to the hook 45 has a boss 47 at a position where the boss 47 can be engaged with the pawl portion 45b of the hook 45.

In the state where the upper cover 6 is closed, the pawl portion 45b of the hook 45 is not in engagement with the boss 47 as shown in FIG. 7A.

As shown in FIG. 7B, from the state of FIG. 7A, the automatic document reader 20 can be rotated or opened upward by a predetermined angle against the urging force from the guide spring 39. Therefore, a printed sheet 3 placed on the sheet discharge tray 9 can be easily removed therefrom. In particular, the removal of a small-sized sheet 3 therefrom is easier to perform. In this state, the upper cover 6 is closed, so that the pawl portion 45b of the hook 45 is not in engagement with the boss 47.

When the upper cover 6 is further rotated upward (in a direction indicated by an arrow U in FIG. 8A) from the state of FIG. 7B, the first notch 35 of the side gear 37 is disengaged from the lever protrusion 31b of the lever 31. Then, the automatic document reader 20, which is located at the inclined position with respect to the upper cover 6 by the urging force from the guide spring 39, is rotated (closed) toward the upper cover 6. Therefore, the end 45c is separated from the upper surface of the body casing 2, so that the end 45c of the hook 45 rotates downwardly by the force from the torsion spring 46 and the pawl portion 45b and the boss 47 can be engaged with each other.

As described above, as shown in FIG. 8B, when the upper cover 6 is upwardly open, the pawl portion 45b of the hook 45 is engaged with the boss 47 while the tip 22a of the document discharge tray 22 of the automatic document reader 20 is located at the nearest position with respect to the upper cover 6. Thus, the automatic document reader 20 is locked in the closed position. Accordingly, the automatic document reader 20 does not rotate (is not open) in the direction which the automatic document reader 20 is separated from the upper cover 6, even when the upper cover 6 is open. Accordingly, a printed sheet 3 is prevented from falling from the sheet discharge tray 9.

When the upper cover 6, located at the upright position shown in FIG. 8B, is rotated about the cover shaft 8 to be closed, the pawl portion 45b of the hook 45 is disengaged from the boss 47, and the upper cover 6 is finally returned to the state of FIG. 7A.

Figure 9:
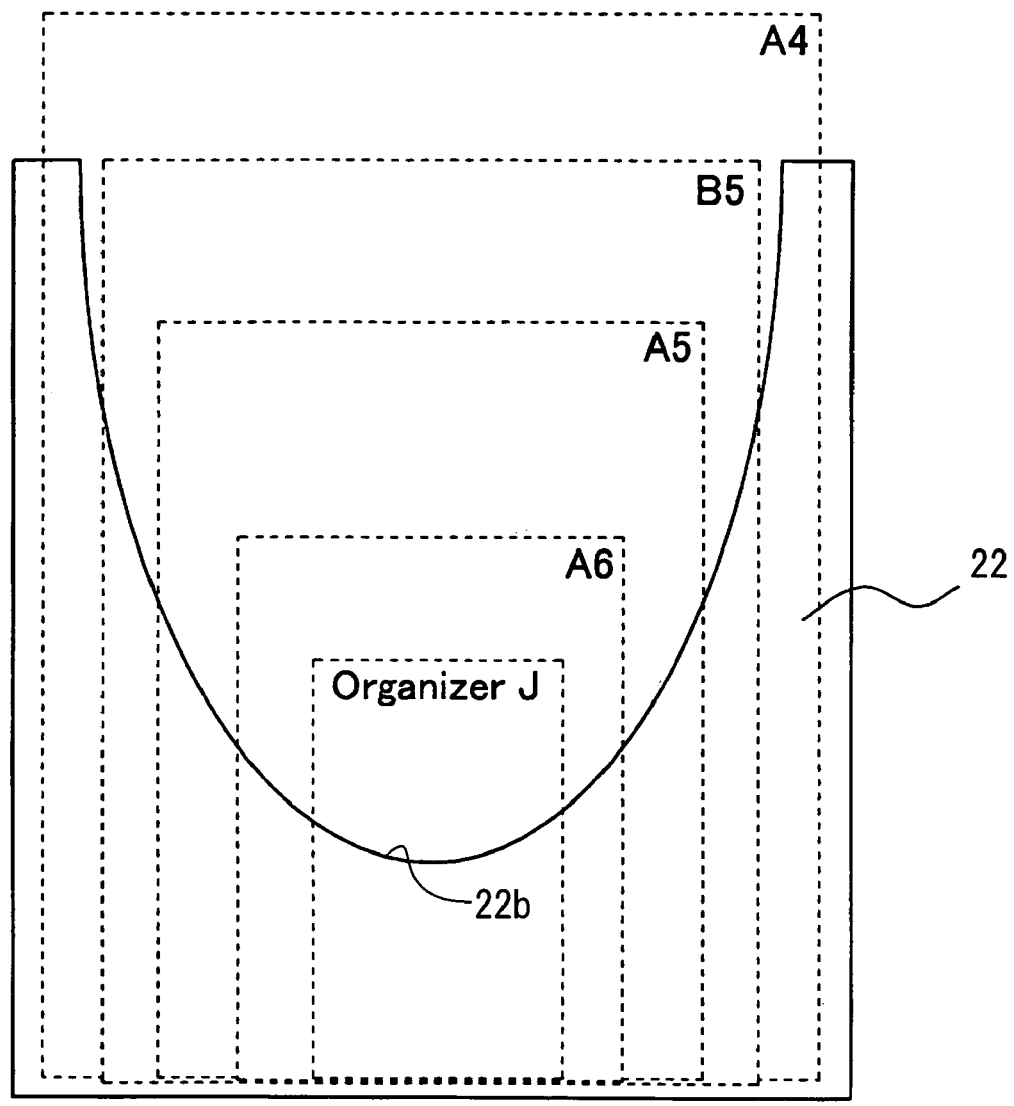
FIG. 9 illustrates a document discharge tray.

FIG. 9 represents a shape of the document discharge tray 22. The document discharge tray 22 has a U-shaped cutaway portion 22b opening toward the document discharging direction. The document discharge tray 22 may have a V-shaped cutaway portion. With this shape, any-sized document placed on the document discharge tray 9 provided to the upper cover 6 can be easily removed therefrom through the U-shaped or V-shaped cutaway portion even when the automatic document feeder 20 is closed. In addition, a printed sheet 3 placed on the sheet discharge tray 9 can be surely support by the document discharge tray 22 even when the upper cover 6 is open.

In the first to fourth exemplary embodiments described above, the color printer 1 does not require a special sheet drop preventive mechanism to be separately equipped because the fall of the printed sheets 3 is prevented by the document reading portion 23 and the document discharge tray 22. Therefore, the manufacturing cost of the color printer 1 is not increased.

The document reading portion 23 and the document discharge tray 22 of the automatic document reader 20 function as a recording medium support device. The cover arm 25, the guide slot 26 and guide arm 27 of the second exemplary embodiment, and the lever 21, the side gear 37 and the guide spring 39 of the third exemplary embodiment function as an interlock mechanism. The hook 45, the torsion spring 45 and the boss 47 of the fourth exemplary embodiment function as a locking mechanism.

Figure 10:
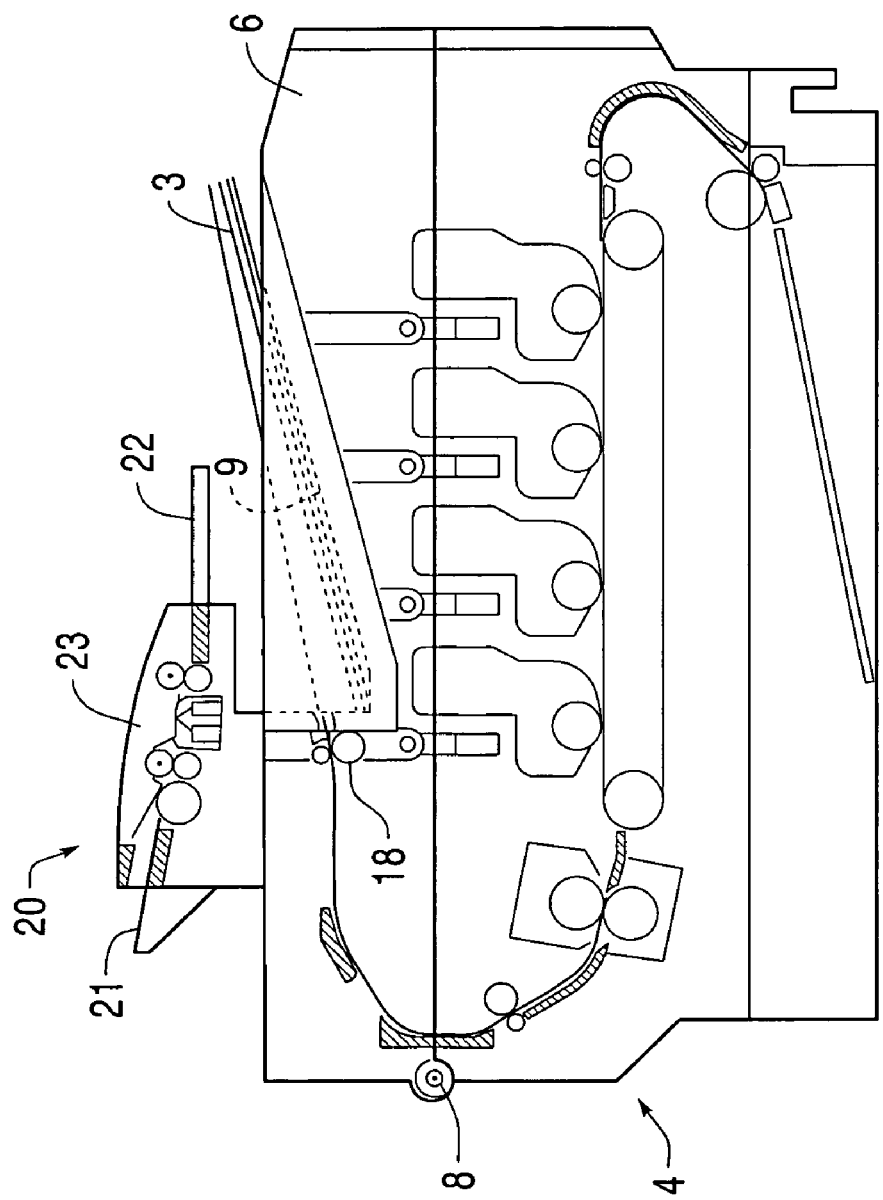
FIG. 10 represents a color printer according to an exemplary embodiment of the disclosure.

In the first to fourth exemplary embodiments described above, a portion of the sheet discharge tray 9 that holds sheets 3 is located below a portion of the document reading portion 23 that contacts the upper cover 6. However, as shown in FIG. 10, the sheet discharge tray 9 can be located to the right of the portion of the document reading portion 23 that contacts the upper cover 6. Furthermore, a thicker upper cover 6 can be provided such that the sheet discharge tray 9 does not protrude below a flat portion of the upper cover 6.

While the disclosure has been described in detail with reference to the specific exemplary embodiments thereof, it would be apparent to those skilled in the art that various changes, arrangements and modifications may be applied therein without departing from the spirit and scope of the disclosure.

According to exemplary aspect of the disclosure, the printed recording medium placed on the discharge tray is supported by the automatic document feeder, so that the printed recording medium does not fall from the discharge tray. In addition, any other special recording medium support device other than the automatic document reader is provided, so that a parts count and a manufacturing cost of the image forming apparatus are not increased. Further, the structure of the image forming apparatus does not become complicated due to the provision of the recording medium support device for supporting a recording medium placed on the recording medium discharge tray to prevent the recording medium from falling therefrom.

According to an exemplary aspect of the disclosure, a printed recording medium placed on the discharge tray provided under the automatic document reader can be easily removed therefrom. In particular, when the automatic document reader is upwardly rotated to open, a small-sized recording medium placed on the discharge tray provided under the automatic document reader can be easily removed therefrom.

According to an exemplary aspect of the disclosure, a printed recording medium placed on the discharge tray can be surely prevented from falling therefrom by employing at least one of the document reading portion and the document discharge tray of the automatic document reader.

According to an exemplary aspect of the disclosure, the cover member is upwardly rotated to the substantially upright position, so that the check, maintenance and replacement of the image forming device, for example, a process unit, disposed under the cover member can be easily performed.

According to an exemplary aspect of the disclosure, by the provision of the interlock mechanism, the automatic document reader can be moved to the position near the discharge tray in conjunction with the opening of the cover member. Accordingly, it is unnecessary to perform an operation to return the automatic document reader to the near position in advance before the cover member is rotated upward to be open. In addition, it can be prevented that the cover member is opened with the automatic document reader returned to the near position.

According to an exemplary aspect of the disclosure, the automatic document reader is locked so as not to rotate while positioned at the nearest position with respect to the discharge tray when the cover member is located at the substantially upright position. Therefore, the automatic document reader can be prevented from rotating accidentally.

According to an exemplary aspect of the disclosure, even when the automatic document reader is in the closed state, a printed recording medium placed on the discharge tray can be easily removed therefrom through the U- or V-shaped cutaway portion which is open toward the document discharge direction in the document discharge tray. In addition, the recording medium placed on the discharge tray can be surely supported when the cover member is open.

According to an exemplary aspect of the disclosure, the recording medium discharge direction and the document discharge direction are the same. Therefore, the printed recording medium and the document can be removed from the respective discharge trays from the same side of the body casing. Thus, user operability is increased.

According to an exemplary aspect of the disclosure, the recording medium cassette can be also attached to and detached from the body casing from the same side of the body casing, so that the user operability is further increased.

According to an exemplary aspect of the disclosure, in the image forming apparatus including the so-called tandem color printer and the automatic document feeder, by opening the cover member, a user can easily access or operate the image forming device in the body casing without being interfered with the automatic document reader. Accordingly, the replenishment of developing agent and replacement of the image forming device can be easily performed. In addition, even when a printed recording medium is placed on the discharge tray, the fall of the recording medium caused by the opening of the cover member is prevented, so that the maintenance can be easily and speedily performed.

What is claimed is:

1. An image forming apparatus, comprising:
    a cover member that is capable of being opened and closed, wherein the cover member includes a discharge tray that is capable of holding a printed recording medium; and
    an automatic document reader that is provided above the discharge tray, wherein when the cover member is opened to a predetermined position, the automatic document reader supports the printed recording medium placed on the discharge tray so that the printed recording medium does not fall therefrom when the cover member is open.

2. The image forming apparatus according to claim 1, wherein the automatic document reader is capable of rotating within a range of predetermined angles in a direction in which the automatic document reader approaches and separates from the discharge tray, while the cover member is closed.

3. The image forming apparatus according to claim 1, wherein the automatic document reader includes:
    a document feed tray that feeds at least a document;
    a document discharge tray that supports an already-read document; and
    a document reading portion that is provided between the document feed tray and the document discharge tray to read the document, wherein at least one of the document discharge tray and the document reading portion functions as a support device.

4. The image forming apparatus according to claim 1, wherein the cover member is capable of rotating to a position where the cover member extends substantially in an upright direction.

5. The image forming apparatus according to claim 1, further comprising an interlock mechanism that moves the automatic document reader to a position adjacent the discharge tray in conjunction with an opening of the cover member.

6. The image forming apparatus according to claim 1, wherein:
    the cover member is rotatable to a position where the cover member extends substantially in an upright direction, and
    the image forming apparatus further comprises a locking mechanism that locks the automatic document reader so as not to rotate relative to the cover member, while the automatic document reader is positioned at a position nearest to the discharge tray when the cover member is rotated to the substantially upright position.

7. The image forming apparatus according to claim 3, wherein the document discharge tray has at least one of a U-shaped cutaway portion and a V-shaped cutaway portion which are open toward a document discharge direction.

8. The image forming apparatus according to claim 3, wherein a direction to discharge the printed recording medium onto the discharge tray is the same as the document discharge direction.

9. The image forming apparatus according to claim 1, further comprising:
    a recording medium cassette that is provided below the cover member and feeds recording medium to an image forming device, wherein the recording medium cassette is attachable to and detachable from a side which is the same as a downstream side of a recording medium discharge direction.

10. The image forming apparatus according to claim 1, further comprising:
    a plurality of image forming devices aligned in a direction which is the same as a recording medium discharge direction, in a body casing of the image forming apparatus, in order to form images onto the printed recording medium by different colors.

11. The image forming apparatus according to claim 1, wherein:
    the cover member has a first end and a second end and the discharge tray extends from the first end where printed recording medium are discharged to the second end; and
    the automatic document reader includes a first bottom surface that is mounted to the first end and a second bottom surface that extends from a position adjacent to the first bottom surface to the second end, wherein when the cover member is opened to the predetermined position, the automatic document reader directly contacts the printed recording medium placed on the discharge tray.

12. An image forming apparatus, comprising:
    a body that stores therein an image forming portion;
    a cover member that is attached to the body at a first end of the cover member and is capable of being opened and closed by rotating about the first end, wherein the cover member includes a discharge tray that is capable of holding printed recording medium; and
    an automatic document reader that is provided above the discharge tray and attached to the cover member at the first end of the cover member, wherein the automatic document reader extends from the first end and covers a part of the discharge tray.

13. The image forming apparatus according to claim 12, wherein the automatic document reader is capable of rotating within a range of predetermined angles in a direction in which the automatic document reader approaches and separates from the discharge tray, while the cover member is closed.

14. The image forming apparatus according to claim 12, wherein the automatic document reader includes:
- a document feed tray that feeds at least a document;
- a document discharge tray that supports an already-read document; and
- a document reading portion that is provided between the document feed tray and the document discharge tray to read the document, wherein at least one of the document feed tray, the document discharge tray and the document reading portion functions as a support device.

15. The image forming apparatus according to claim 12, wherein the cover member is capable of rotating to a position where the cover member extends substantially in an upright direction.

16. The image forming apparatus according to claim 12, further comprising an interlock mechanism that moves the automatic document reader to a position adjacent the discharge tray in conjunction with an opening of the cover member.

17. The image forming apparatus according to claim 12, wherein:
the cover member can rotate to a position where the cover member extends substantially in an upright direction, and
the image forming apparatus further comprises a locking mechanism that locks the automatic document reader so as not to rotate relative to the cover member, while the automatic document reader is positioned at a position nearest to the discharge tray when the cover member is rotated to the substantially upright position.

18. The image forming apparatus according to claim 14, wherein the document discharge tray has at least one of a U-shaped cutaway portion and a V-shaped cutaway portion which are open toward a document discharge direction.

19. The image forming apparatus according to claim 14, wherein a direction to discharge the printed recording medium onto the discharge tray is the same as the document discharge direction.

20. The image forming apparatus according to claim 12, further comprising:
a recording medium cassette that is provided at a lower portion of the body and feeds the recording medium to the image forming portion, the recording medium cassette attachable to and detachable from the body from a side which is the same as a downstream side of a recording medium discharge direction.

21. The image forming apparatus according to claim 12, further comprising:
a plurality of image forming devices aligned in a direction which is the same as the recording medium discharge direction, in a body casing of the image forming apparatus, in order to form images onto the printed recording medium by different colors.

* * * * *